US006256872B1

(12) United States Patent
Landtroop et al.

(10) Patent No.: US 6,256,872 B1
(45) Date of Patent: Jul. 10, 2001

(54) GUITAR STRING MANUFACTURING AUTO START WINDING PROCESS

(76) Inventors: Jeffrey E. Landtroop, 4778 Morley Dr., Vicksburg, MI (US) 49097; Donald A. Dykstra, 4221 Divison S.. Rte. 1, Wayland, MI (US) 49348

( * ) Notice: Subject to any disclaimer, the term of this patent is extended or adjusted under 35 U.S.C. 154(b) by 0 days.

(21) Appl. No.: 09/183,618

(22) Filed: Oct. 30, 1998

(51) Int. Cl.[7] ........................... B23P 19/00; B21C 47/02; B21C 47/10; D02G 3/36

(52) U.S. Cl. ........................ 29/820; 242/448; 242/447.3; 57/212; 57/13

(58) Field of Search ................................ 242/448.1, 448, 242/447, 447.3; 29/505, 820, 819; 57/211, 212, 214, 9, 13, 14

(56) References Cited

U.S. PATENT DOCUMENTS

| | | | | |
|---|---|---|---|---|
| 584,708 | * | 6/1897 | Schaff | 242/448.1 X |
| 634,266 | * | 10/1899 | Monighan et al. | 242/448.1 X |
| 635,039 | * | 10/1899 | Emerson | 242/447.3 |
| 1,102,233 | * | 7/1914 | Biava | 242/447.3 |
| 2,241,283 | * | 5/1941 | Wackerle | 242/448 X |
| 3,262,256 | * | 7/1966 | Vinciguerra | 242/448 |
| 4,055,038 | * | 10/1977 | Conklin, Jr. | 242/447.3 |

* cited by examiner

*Primary Examiner*—S. Thomas Hughes
*Assistant Examiner*—Marc Jimenez
(74) *Attorney, Agent, or Firm*—Robert O. Guillot; Oppenheimer Wolff & Donnelly LLP

(57) ABSTRACT

The improved musical string includes a prior art core wire assembly including a core wire and a terminal end. The cover wire has an end portion that is bent around the terminal end portion of the core wire, and the cover wire is then wound the core wire to form the musical string. The improved cover wire winding machine includes a headstock with a rotatable spindle and a core wire terminal end mounting hook. A cover wire mounting sleeve is slidably and rotatably engaged to the spindle and functions to mechanically engage an end of the cover wire and to bend it into engagement with the core wire terminal end following engagement, the cover wire is wound around the core wire to produce the improved musical string.

5 Claims, 3 Drawing Sheets

GUITAR STRING MANUFACTURING AUTO START WINDING PROCESS

BACKGROUND OF THE INVENTION

1. Field of the Invention

The present invention relates generally to musical strings and the manufacturing methods therefor, and more particularly to an improved cover wire winding machine and a string that results therefrom.

2. Description of the Prior Art

This invention pertains to the manufacturing of musical strings such as guitar or mandolin strings and particularly to the winding process of compound strings for these instruments. These strings consist of several parts including a terminal end, a core wire and a cover wire. The core wire is secured to the terminal end by bending the end of the wire around the terminal end spool or bead and making several twist turns, thereby securing the bead to one end of the core wire. This core wire assembly is then passed to a winding machine to receive a layer of soft cover wire which is wound around the core wire assembly. A typical prior art winding machine has a motor driven headstock and a tailstock. A moving carriage is mounted between the headstock and tailstock to guide the cover wire while it is being fed onto the core wire. To wind the cover wire onto the core wire the winding machine operator places a core wire assembly between a hook on the head stock and the chuck on the tailstock to be stretched in preparation for winding.

Next, and most significantly, the end of the cover wire must be secured to the core wire to begin the winding process. In the prior art it has been common practice to manually insert the end of the cover wire into a tiny open triangle formed by the core wire winding at the terminal end in order to secure the cover wire. Manipulating and inserting the cover wire into the small triangle takes up a large percentage of the time required to wind a string and adds to operator stress as well.

The present invention eliminates entirely the necessity for the operator to insert or connect the cover wire to the core wire before the winding begins. Rather, the present invention automatically engages the cover wire to the core wire prior to winding. With this invention the operator simply hooks the core wire to the headstock, inserts the other end in the tailstock wire chuck and presses a switch to begin the automatic cover wire connection and winding operation.

SUMMARY OF THE INVENTION

The improved musical string includes a prior art core wire assembly including a core wire and a terminal end. The cover wire has an end portion that is bent around the terminal end portion of the core wire, and the cover wire is then wound around the core wire to form the musical string. The improved cover wire winding machine includes a headstock with a rotatable spindle and a core wire terminal end mounting hook. A cover wire mounting sleeve is slidably and rotatably engaged to the spindle and functions to mechanically engage an end of the cover wire and to bend it into engagement with the core wire terminal end following engagement, the cover wire is wound around the core wire to produce the improved musical string.

It is an advantage of the present invention that an improved musical string is produced.

It is another advantage of the present invention that a musical string is produced that is quicker, easier and less expensive to manufacture.

It is a further advantage of the present invention that an improved string cover wire winding machine has been developed that is automated and requires less operator involvement.

It is yet another advantage of the present invention that an improved string cover wire winding machine has been developed that produces strings more rapidly than prior machines.

It is an advantage of the cover wire attachment and winding method of the present invention that it is automated, such that operator involvement and stress is reduced.

These and further objects and advantages of the present invention will become well understood upon review of the following detailed description which makes reference to the several figures of the drawing.

IN THE DRAWINGS

DETAILED DESCRIPTION OF THE PREFERRED EMBODIMENTS

The musical string of the present invention includes an improved method for winding the cover wire upon the core wire assembly. To achieve this an improved headstock for a cover wire winding machine has been developed to automatically engage the cover wire end to the terminal end of the core wire. Utilizing the improved cover wire winding machine, significant savings in man-hours, costs and operator stress are achieved over the prior art cover wire winding process. A detailed description of the preferred embodiments of the present invention follows.

Figure 1:
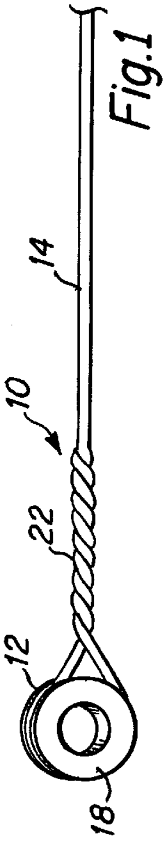
FIG. 1 is a perspective view of a prior art core wire assembly.

A standard core wire assembly 10 is depicted in perspective view in FIG. 1. As depicted therein, at the terminal end 12 of the core wire assembly 10 the end of a core wire 14 is bent tightly around a spool-like terminal end member or bead 18 and twisted tightly 22 to firmly engage the bead 18 with the core wire 14.

Figure 2:
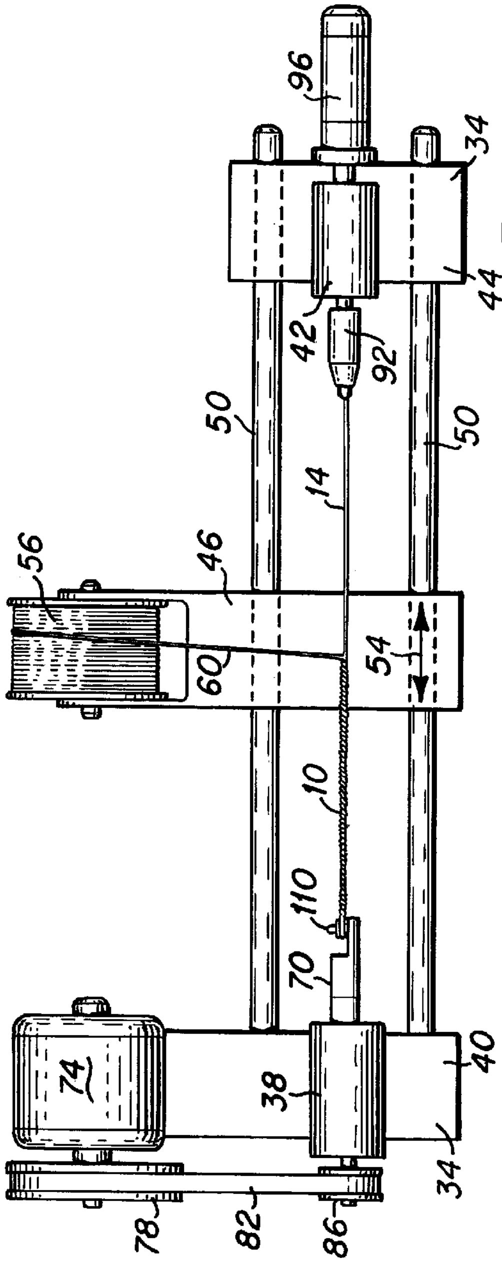
FIG. 2 is a side elevational view of a typical prior art cover wire winding machine.

The next step in the manufacturing of the musical string is to tightly wind a relatively soft cover wire around the core wire, and a cover wire winding machine 30 is utilized to perform this task. A top plan view of a typical cover wire winding machine 30 is depicted in FIG. 2. The cover wire winding machine 30 includes a frame 34 having a headstock 38 mounted on one end 40 thereof and a tail stock 42 mounted on the other end 44 thereof. A movable carriage 46 is mounted upon two guide rods 50 to travel 54 between the headstock 38 and tailstock 42. A spool 56 of cover wire 60 is mounted to carriage 46. The headstock 38 includes a rotatable spindle 70 which is rotated by a motor 74 utilizing a motor pulley 78, a belt 82 and a headstock pulley 86. Thus, rotation of the motor 74 causes rotation of the spindle 70. A core wire assembly 10 is mounted between the rotating spindle 70 and a wire chuck 92 that is mounted to the tailstock 42, and a tension cylinder 96 is mounted to the tailstock to apply tension to the core wire assembly 10 that is engaged between the spindle 70 and the wire chuck 92. In the operation of the prior art cover wire winding machine depicted in FIG. 2, the end of the cover wire is engaged to the core wire assembly 10 at the terminal end 12 and the motor is activated to rotate the spindle 70 and therefore the attached core wire assembly 10. As the core wire assembly 10 rotates, the carriage 46 travels towards the tailstock and cover wire 60 is played out under tension from the spool 56 to wind about the rotating core wire assembly 10. When the carriage 46 reaches the tail end of the core wire 12, the cover wire 60 is severed. The musical string having the cover wire wound about the core wire is then removed from the cover wire winding machine 30. The prior art method for engaging the cover wire end to the core wire, immediately prior to the winding of the cover wire upon the core wire is next discussed with the aid of FIG. 3.

Figure 3:
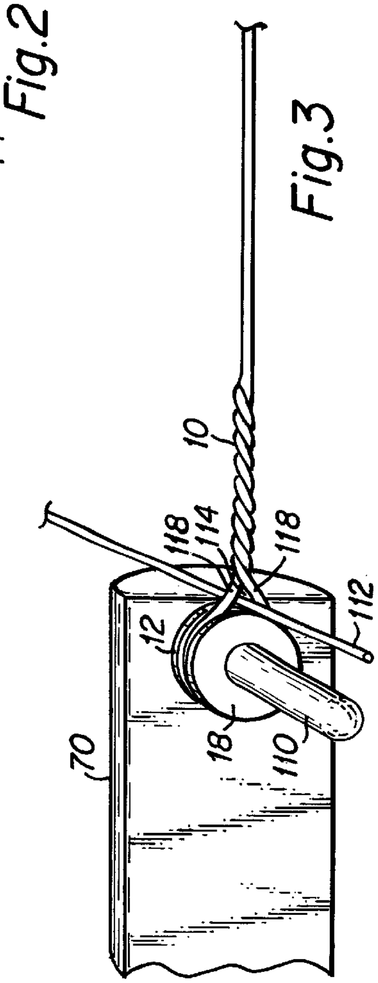
FIG. 3 is a perspective view of a prior art engagement of a cover wire end with the core wire assembly of FIG. 1 disposed within the terminal hook of a prior art headstock for the cover wire winding machine depicted in FIG. 2.

As depicted in FIG. 3, the terminal end 12 of the core wire 14 includes a spool-like member or bead 18 that is mounted upon a projecting peg, or hook 110, which projects laterally from a side of the rotating spindle 70. The cover wire end 112 projects through the small open triangle 114 formed between the edge of the bead 18 and the twisted portions 118 of the core wire 14. In this prior art assembly method, the insertion of the cover wire end 112 into the small triangle 114 is a manual operation which requires some patience and dexterity on the part of the operator because the triangle 114 can be rather small, whereby it can be difficult to insert the cover wire end 112 therethrough. Where operator speed and efficiency are important in order to lower manufacturing costs, the manual insertion of the cover wire end 112 into the triangle 114 is a significant impediment. The present invention provides an improved method for engaging the cover wire with the terminal end of the core wire, and thereby produces an improved musical string. The detailed features of the present invention are next described with the aid if FIGS. 4–9.

Figure 4:
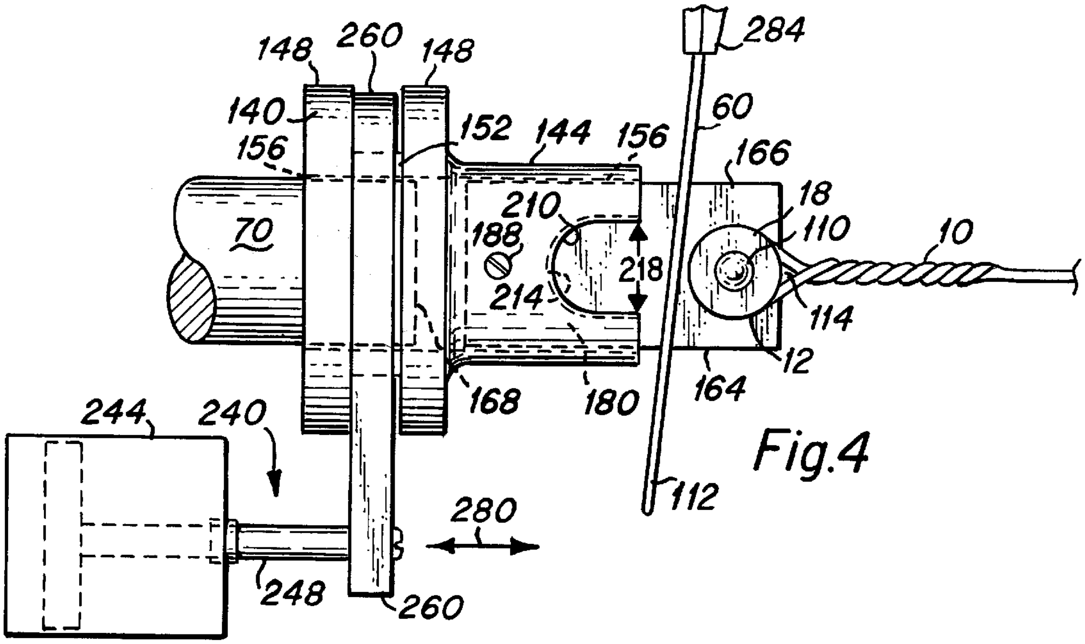
FIG. 4 is a top plan view depicting the improved winding machine headstock for the cover wire mounting method of the present invention.
Figure 5:
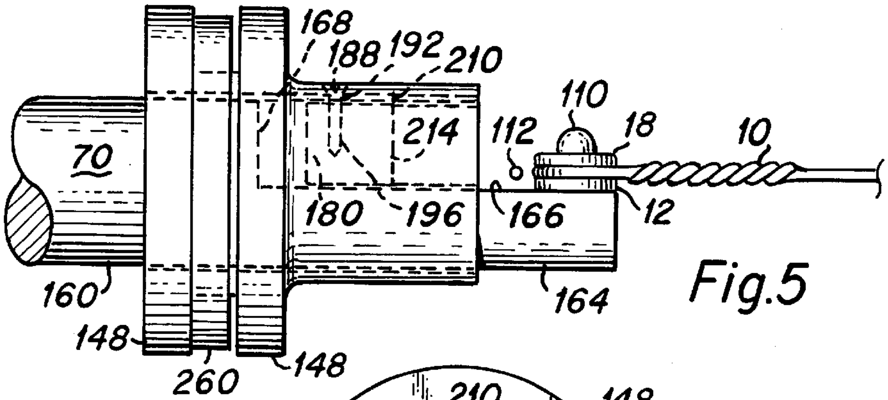
FIG. 5 is a side elevational view of the headstock depicted in FIG. 4.
Figure 6:
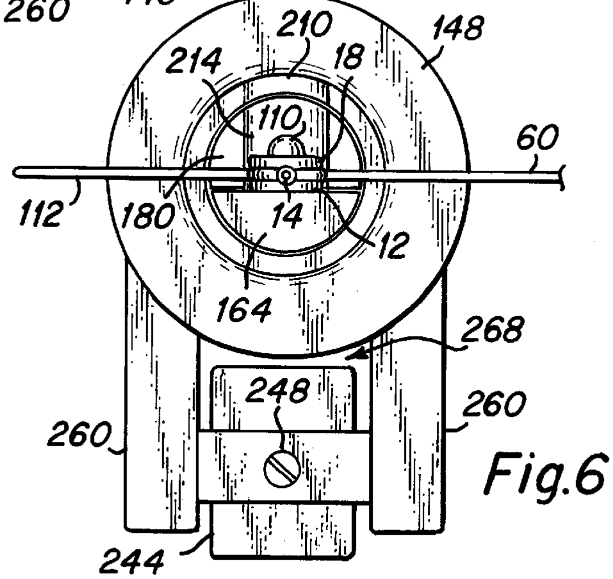
FIG. 6 is an end elevational view of the headstock depicted in FIGS. 4 and 5.

FIG. 4 is a top plan view depicting the improved cover wire mounting device of the present invention, FIG. 5 is a side elevational view of the device depicted in FIG. 4 and FIG. 6 is an end elevational view thereof. As depicted in FIGS. 4, 5 and 6, the core wire terminal end 12 is mounted upon the spindle hook 110 as was done in the prior art mounting method depicted in FIG. 3. However, the cover wire end 112 is placed behind the terminal end 12 rather than through the triangle 114. A cover wire mounting sleeve 140 is slidably engaged upon the rotatable spindle 70. The sleeve is a generally cylindrical member having a cylindrical nose portion 144 and two rearwardly disposed, enlarged diameter flanges 148 having a reduced diameter neck 152 disposed therebetween. A cylindrical bore 156 is formed axially through the sleeve 140, such that the sleeve is slidably engaged upon the spindle 70.

As is best seen with the aid of FIG. 5, the spindle 70 is formed with a round rearwardly disposed portion 160 and a half-round outwardly disposed section 164 having a flat surface 166. A shoulder 168 is formed at the transition between the half-round portion 164 and the full round portion 160 of the spindle 70. As is discussed in detail herebelow, it is an important feature of the preferred embodiment that the sleeve 140 is rotatably engaged to the spindle, as well as being slidably engaged as is discussed hereabove. To accomplish the rotatable engagement of the sleeve 140 with the spindle 70, a half-round shoe piece 180 is disposed within the sleeve bore 156 within the nose portion 144 of the sleeve 140. The flat surface of the half-round shoe 180 is disposed to make contact with the flat surface 166 of the half-round portion 164 of the sleeve 70. A shoe attachment screw 188 passes through a bore 192 formed in the nose portion 144 of the sleeve 140, and the screw 188 is threadably engaged in a threaded bore 196 formed in the shoe 180. The engagement of the shoe 180 to the sleeve 140 within the bore 156 of the sleeve 140, serves to cause the sleeve 140 to rotate when the spindle 70 rotates.

A U-shaped cover wire bending slot 210 is formed in the nose portion 144 of the sleeve 140, and a matching slot 214 is formed in the outward portion of the shoe 180. The frontward opening 218 of the U-shaped slots 210 and 214 is slightly larger than the diameter of the bead 18 of the terminal end 12 of the cover wire assembly 10.

A pneumatic actuating assembly 240 is utilized to move the sleeve 140 in its slidable engagement upon the spindle 70. The actuating assembly includes a pneumatic piston 244 having a projecting arm 248 that is fixedly engaged to a generally U-shaped sleeve actuating fork 260. The fork 260 includes a U-shaped opening having a sufficient width such that the fork 260 may be mounted within the necked portion 152 of the sleeve 140. It is therefore to be understood that the lateral motion 280 of the arm 248 will cause the actuating fork to move laterally, which will cause the sleeve 140 to likewise move laterally due to the engagement of the actuating fork within the necked portion 152 of the sleeve 140. It is also to be understood that when the sleeve 140 rotates in its engagement with the spindle 70, that the actuating fork 260 will not rotate. To further facilitate the automatic mounting of the cover wire upon the core wire assembly 10, a mechanical manipulator 284 which grips and directs the cover wire towards its position behind the terminal end 12 is preferably utilized. The manipulator holds the cover wire end 112 in place during the initial mounting steps.

Figure 7:
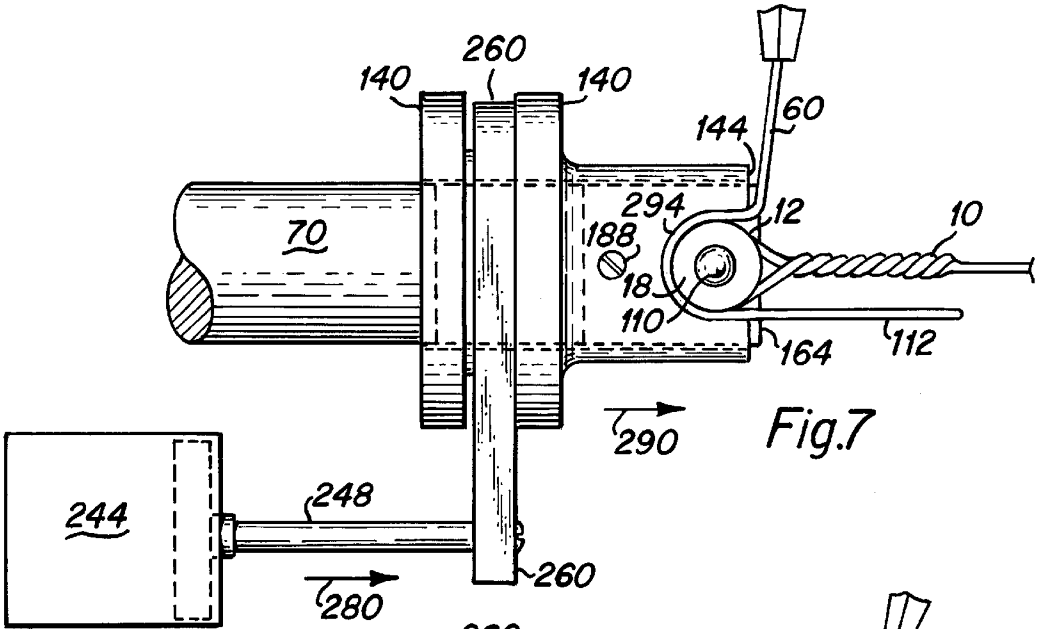
FIG. 7 is a top plan view depicting the cover wire engagement method of the present invention.

The mounting of the end 112 of the cover wire 60 to the terminal end 12 of the core wire assembly 10 is depicted in FIG. 7. The pneumatic actuator 244 has been actuated, such that the arm 248 has moved laterally 280. The actuating sleeve 260 has therefore caused the sleeve 140 to slidably move laterally 290 upon the spindle 70. The end 112 of the cover wire 60 has become captured within the U-shaped slots 210 and 214 as the nose portion 144 of the sleeve 140 has moved around the terminal end 18 of the core wire assembly 10. Thus, a portion 294 of the cover wire 60 has been bent tightly around the bead 18 at the terminal end 12 of the cover wire assembly 10. As a further result of the bending of the cover wire 60 by the U-shaped slot, the terminal end 112 of the cover wire 60 has been bent into a parallel orientation relative to the core wire assembly 10. It is to be understood that the bent portion 294 of the cover wire 60 around the bead 18 provides an initial engagement of the cover wire 60 with the core wire assembly 10. The cover wire 60 is next wound around the core wire assembly 10, as is described next below with the aid of FIG. 8.

Figure 8:
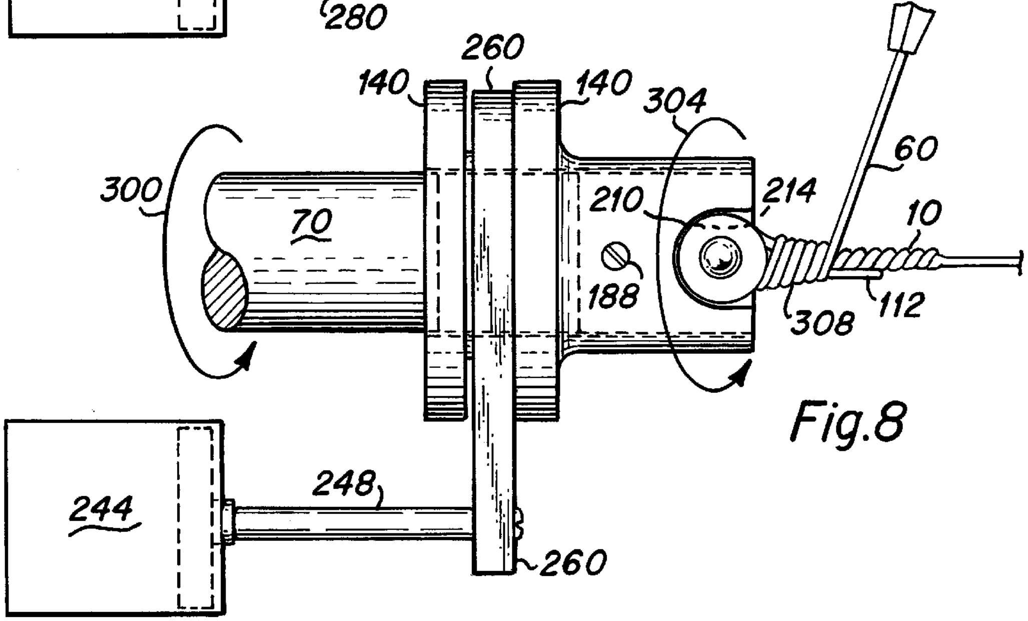
FIG. 8 is a top plan view depicting the initial winding of the cover wire upon the core wire.

FIG. 8 depicts the initial winding of the cover wire 60 upon the core wire assembly 10. As depicted therein, the spindle 70 has commenced to rotate 300. In like manner, the sleeve 140 also rotates 304 due to the rotatable engagement of the sleeve 140 with the spindle 70. It is important to note that the sleeve 140 is maintained in its forward cover wire bending disposition with respect to the spindle 70 during the cover wire rotation process, because the slots 210 and 214 serve to hold the bent cover wire portion 294 in tight contact with the terminal end 18 during the initial winding of the cover wire 60 upon the core wire assembly 10. It is also to be noted, as depicted in FIG. 8, that the winding of the cover wire 60 around the core wire assembly 10 wraps and encloses the end portion 112 of the cover wire 60 within the winding 308. As with the prior art cover wire winding machine, the spindle 70 continues to rotate and the cover wire 60 is wound about the core wire 14 until the end of the core wire is reached proximate the tailstock 42. Thereafter, the cover wire 60 is severed and the improved musical string of the present invention is removed from the winding machine. The core wire mounting sleeve 140 is then retracted by the piston 244 such that another core wire assembly 10 can be mounted to the hook 110 and another cover wire end 112 can be automatically engaged thereon by the operation of improved cover wire winding machine of the present invention.

Figure 9:
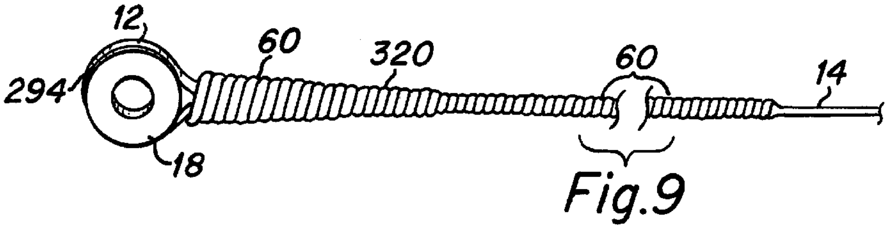
FIG. 9 is a perspective view of the improved musical string of the present invention.

FIG. 9 depicts a completed musical string 320 of the present invention. The string 320 includes the terminal end 12 of the core wire assembly 10 wherein the end portion 294 of the cover wire 60 has been bent around the bead 18, and further portions of the cover wire 60 have been wound around the core wire 14 as has been described hereabove. The significant advantages of the improved musical string 320 are that it is easier and less expensive to manufacture, and that the cover wire is automatically engaged upon the core wire, without operator involvement that is required in the prior art.

While the present invention has been shown and described with regard to certain preferred embodiments, it is to be understood that those skilled in the art will devise alterations and modifications thereto upon comprehending the invention described herein. Therefore, it is intended that the following claims cover all such alterations and modifications that nevertheless contain the true spirit and scope of the invention.

What we claim is:

1. An improved musical string cover wire winding machine, comprising:

a headstock having a rotatable spindle mounted therein; said spindle including a core wire terminal end mounting device;

a tailstock having a core wire tail end engagement chuck mounted thereto;

a cover wire winding carriage being movably mounted between said headstock and said tailstock;

a cover wire mounting sleeve being slidably engaged to said spindle and having a cover wire engagement end adapted to mechanically engage an end of a cover wire and to bend the cover wire end into engagement with a core wire terminal end; and an actuator being engaged to said sleeve and being operable to move said sleeve in said slidable engagement with said spindle.

2. A machine as described in claim 1 wherein a string mounting axis is disposed between said cover wire terminal end mounting device and said cover wire tail end engagement chuck, and wherein said sleeve is slidably engaged upon said spindle to slidably move in a direction parallel to said string mounting axis.

3. A machine as described in claim 1 wherein said sleeve is rotatably engaged with said spindle.

4. A machine as described in claim 1 wherein said sleeve includes a U-shaped slot formed in said cover wire engagement end thereof to mechanically bend the cover wire end.

5. A machine as described in claim 4 wherein said sleeve is slidably engaged upon said spindle to engage said cover wire end within said U-shaped slot to bend said cover wire end around a terminal end of a core wire.

* * * * *